US 9,986,091 B2

(12) United States Patent
Townsend

(10) Patent No.: US 9,986,091 B2
(45) Date of Patent: *May 29, 2018

(54) LIMITING CONTACT IN A NETWORKED CONTACT CENTER ENVIRONMENT

(71) Applicant: 8x8, Inc., San Jose, CA (US)

(72) Inventor: Robert Townsend, Mt. View, CA (US)

(73) Assignee: 8x8, Inc., San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/070,961

(22) Filed: Mar. 15, 2016

(65) Prior Publication Data
US 2016/0198048 A1 Jul. 7, 2016

Related U.S. Application Data

(63) Continuation of application No. 14/496,137, filed on Sep. 25, 2014, now Pat. No. 9,294,625, which is a
(Continued)

(51) Int. Cl.
*H04M 3/00* (2006.01)
*H04M 3/51* (2006.01)
(Continued)

(52) U.S. Cl.
CPC ......... *H04M 3/5175* (2013.01); *H04M 3/436* (2013.01); *H04M 3/51* (2013.01); *H04M 3/5183* (2013.01); *H04M 3/5232* (2013.01); *H04M 3/5233* (2013.01); *H04M 15/80* (2013.01); *H04M 15/8027* (2013.01);
(Continued)

(58) Field of Classification Search
CPC ...... H04M 3/523; H04M 3/51; H04M 3/5158; H04M 3/5233
See application file for complete search history.

(56) References Cited

U.S. PATENT DOCUMENTS 5,369,696 A * 11/1994 Krauss .................. H04Q 11/04
379/268
5,887,139 A 3/1999 Madison, Jr. et al.
(Continued)

FOREIGN PATENT DOCUMENTS

WO 2010025110 A1 3/2010
WO 2010025113 A1 3/2010

OTHER PUBLICATIONS

International Search Report and Written Opinion for Int'l Patent Appln. No. PCT/US2009/054780 (dated Oct. 8, 2009).
(Continued)

*Primary Examiner* — Oleg Asanbayev
(74) *Attorney, Agent, or Firm* — Crawford Maunu PLLC

(57) ABSTRACT

This document discusses, among other things, limiting contact to a networked contact center that is a host to multiple tenants. In an example embodiment, a communication is received by a networked contact center. In determining whether to allow the communication to reach contact center resources, a contact rate value may be examined. The contact rate value may represent an allowable quantity of contact within a time interval. For some example embodiments, a determination of whether the network contact center is to accept or reject the communication is made based on the contact rate value.

15 Claims, 14 Drawing Sheets

Related U.S. Application Data continuation of application No. 13/552,428, filed on Jul. 18, 2012, now Pat. No. 8,855,291, which is a continuation of application No. 12/201,639, filed on Aug. 29, 2008, now Pat. No. 8,243,913.

(51) Int. Cl.
  *H04M 3/436* (2006.01)
  *H04M 3/523* (2006.01)
  *H04M 15/00* (2006.01)

(52) U.S. Cl.
  CPC ...... *H04M 3/5235* (2013.01); *H04M 2201/12* (2013.01); *H04M 2201/14* (2013.01); *H04M 2201/18* (2013.01)

(56) References Cited

U.S. PATENT DOCUMENTS

| | | | |
|---|---|---|---|
| 6,005,931 | A | 12/1999 | Neyman et al. |
| 6,154,465 | A | 11/2000 | Pickett |
| 6,201,863 | B1 | 3/2001 | Miloslaysky |
| 6,278,777 | B1 | 8/2001 | Morley et al. |
| 6,333,979 | B1 | 12/2001 | Bondi et al. |
| 6,393,467 | B1 | 5/2002 | Potvin |
| 6,553,115 | B1 | 4/2003 | Mashinsky |
| 6,622,170 | B1 | 9/2003 | Harrison et al. |
| 6,687,241 | B1 | 2/2004 | Goss |
| 6,741,698 | B1 | 5/2004 | Jensen |
| 6,760,429 | B1 | 7/2004 | Hung et al. |
| 6,804,345 | B1 | 10/2004 | Bala et al. |
| 6,831,966 | B1* | 12/2004 | Tegan ............... H04M 3/493 370/352 |
| 6,978,452 | B2 | 12/2005 | Oesterreicher et al. |
| 7,028,091 | B1 | 4/2006 | Tripathi et al. |
| 7,028,331 | B2 | 4/2006 | Schwalb |
| 7,124,171 | B1 | 10/2006 | McCann |
| 7,224,783 | B2 | 5/2007 | Creamer et al. |
| 7,328,001 | B2 | 2/2008 | Dawson et al. |
| 7,403,946 | B1 | 7/2008 | Taylor |
| 7,403,995 | B2 | 7/2008 | Mace et al. |
| 7,480,719 | B2 | 1/2009 | Inoue |
| 7,610,388 | B2 | 10/2009 | Yamamoto |
| 7,627,658 | B2 | 12/2009 | Levett et al. |
| 7,644,172 | B2 | 1/2010 | Stewart et al. |
| 7,730,204 | B2 | 6/2010 | Pak |
| 8,275,116 | B2 | 9/2012 | Southwick et al. |
| 2002/0159576 | A1* | 10/2002 | Adams ............... H04L 51/12 379/93.24 |
| 2002/0198943 | A1 | 12/2002 | Zhuang et al. |
| 2003/0123640 | A1 | 7/2003 | Roelle et al. |
| 2003/0172131 | A1 | 9/2003 | Ao |
| 2003/0195934 | A1 | 10/2003 | Peterson et al. |
| 2003/0195943 | A1 | 10/2003 | Bradshaw et al. |
| 2003/0208754 | A1 | 11/2003 | Sridhar et al. |
| 2003/0236907 | A1 | 12/2003 | Stewart et al. |
| 2004/0013112 | A1 | 1/2004 | Goldberg et al. |
| 2004/0083292 | A1 | 4/2004 | Lueckhoff et al. |
| 2004/0088300 | A1 | 5/2004 | Avery et al. |
| 2005/0041647 | A1 | 2/2005 | Stinnie |
| 2005/0135600 | A1 | 6/2005 | Whitman |
| 2006/0026304 | A1 | 2/2006 | Price |
| 2006/0239440 | A1 | 10/2006 | Shaffer et al. |
| 2006/0259522 | A1 | 11/2006 | Nakamura |
| 2007/0073694 | A1 | 3/2007 | Picault et al. |
| 2007/0127665 | A1 | 6/2007 | Brandt et al. |
| 2007/0162908 | A1 | 7/2007 | Erickson et al. |
| 2007/0192415 | A1 | 8/2007 | Pak |
| 2007/0253412 | A1 | 11/2007 | Batteram et al. |
| 2008/0037760 | A1 | 2/2008 | Boughton et al. |
| 2008/0072264 | A1 | 3/2008 | Crayford |
| 2008/0101336 | A1 | 5/2008 | Kumarasamy et al. |
| 2008/0177994 | A1 | 7/2008 | Mayer |
| 2008/0178278 | A1 | 7/2008 | Grinstein et al. |
| 2009/0055195 | A1 | 2/2009 | Karlsgodt |
| 2009/0061850 | A1 | 3/2009 | Li et al. |
| 2009/0064148 | A1 | 3/2009 | Jaeck et al. |
| 2009/0066788 | A1 | 3/2009 | Baum et al. |
| 2009/0133031 | A1 | 5/2009 | Inoue |
| 2009/0161849 | A1* | 6/2009 | Minnich, Jr. ....... H04M 3/5175 379/112.01 |
| 2009/0190728 | A1 | 7/2009 | Bushnell et al. |
| 2009/0216683 | A1 | 8/2009 | Gutierrez |
| 2010/0054439 | A1 | 3/2010 | Salame et al. |
| 2010/0054448 | A1 | 3/2010 | Townsend et al. |
| 2010/0054450 | A1 | 3/2010 | Southwick et al. |
| 2010/0057927 | A1 | 3/2010 | Southwick et al. |
| 2010/0058234 | A1 | 3/2010 | Salame et al. |
| 2010/0232583 | A1 | 9/2010 | Bettis et al. |

OTHER PUBLICATIONS

International Search Report and Written Opinion for Int'l. Patent Appln. No. PCT/US2009/054787 (dated Oct. 13, 2009).

International Search Report and Written Opinion for Int'l. Patent Appln. No. PCT/US2009/054788 (dated Oct. 13, 2009).

Fielding, et al., "Hypertext Transfer Protocol—HTTP/1.1, Chapters 1-9.1.2", (dated Jun. 1999), 22 pgs.

Brown, Donald E., "The Interaction Center Platform," Interactive Intelligence, Inc. (2005), 35 pgs.

Fielding, R., et al., "Hypertext Transfer Protocol—HTTP/1.1, Chapters 1-9.1.2", (Jun. 1999), 22 pgs. Infrequently Noted, "Comet: Low Latency Data for the Browser", [Online]. Retrieved from the Internet: <URL: http://infrequently.org/2006/03/comet-low-latency-data-for-the-browser>, (Mar. 3, 2006), 5 pgs.

McCarthy, Philip, "Ajax for Java developers: Write scalable Comet applications with Jetty and Direct Web Remoting", [Online]. Retrieved from the Internet: <URL: http://www.ibm.com/developerworks/java/library/j-jettydwr/index.html>, (Jul. 17, 2007), 16 pgs.

Fielding, et al. "HTTP/1.1: Connections, 8 Connections", Part of Hypertext Transfer Protocol—HTTP/1.1, RFC 2616, [Online]. Retrieved from the Internet Jan. 12, 2011: <URL: http://www.w3.org/Protocols/rfc2616/rfc2616-sec8.html>, 6 pgs.

U.S. Appl. No. 12/201,599, Preliminary Amendment dated Dec. 8, 2009.

U.S. Appl. No. 12/201,671, Final Office Action dated Dec. 14, 2010.

U.S. Appl. No. 12/201,671, Response filed Jun. 14, 2011 to Final Office Action dated Dec. 14, 2010.

U.S. Appl. No. 12/201,671, Response filed Sep. 28, 2010 to Non Final Office Action dated Jun. 28, 2010.

U.S. Appl. No. 12/201,726, Final Office Action dated Apr. 18, 2011.

U.S. Appl. No. 12/201,726, Non Final Office Action dated Oct. 12, 2010.

U.S. Appl. No. 12/201,726, Response filed Jan. 12, 2011 to Non Final Office Action dated Oct. 12, 2010.

U.S. Appl. No. 12/201,726, Response filed Jun. 20, 2011 to Final Office Action dated Apr. 18, 2011.

U.S. Appl. No. 12/201,671, Non Final Office Action dated Jun. 28, 2010.

* cited by examiner

| | DNIS 1 | DNIS 2 | DNIS 3 | TENANT 1 | TENANT 2 | PLATFORM 1 | CLUSTER 1 | SITE 1 |
|---|---|---|---|---|---|---|---|---|
| INDEX | 0 | 1 | 2 | 3 | 4 | 5 | 6 | 7 |
| TYPE | 1 | 1 | 1 | 2 | 2 | 3 | 4 | 5 |
| NAME | 1-800-111-1111 | 1-800-111-2222 | 1-800-111-3333 | portishead | morcheeba | P5 | C1 | S1 |
| COUNTER | 10 | 50 | 3 | 60 | 40 | 100 | 1000 | 5000 |
| PARENT INDEX | 4 | 3 | -1 | 5 | 6 | 6 | 7 | -1 |
| ROUTE | 1 | 1 | 2 | -1 | -1 | -1 | -1 | -1 |

*FIG. 8*

| | IP1 | IP2 | IP3 | IP4 |
|---|---|---|---|---|
| INDEX | 8 | 9 | 10 | 11 |
| TYPE | 6 | 6 | 6 | 6 |
| NAME | 64.28.122.26 | 64.28.122.27 | 10.2.3.90 | 10.2.3.92 |
| COUNTER | 10000 | 10000 | 5000 | 5000 |
| PARENT INDEX | -1 | -1 | -1 | -1 |
| ROUTE | -1 | -1 | -1 | -1 |
| REJECT | 486 | 486 | 503 | 503 |

| COMMAND | OPTION 1 | OPTION 2 | DESCRIPTION |
|---|---|---|---|
| reloadBucket | all/DNIS/tenant/Platform/Cluster/Site | | THE LIMITER WILL RESET THE CORRESPONDING BUCKETS WITH VALUES EXTRACTED FROM THE LIMIT CAPACITY MODULE |
| setBucket | all/DNIS/tenant/Platform/Cluster/Site | VALUE | THE LIMITER WILL UPDATE A SPECIFIC BUCKET WITH THE VALUE PROVIDED |
| setInterval | VALUE | | THE LIMITER WIL RESET THE INCREMENT MODULE TO INCREMENT BUCKET VALUES ACCORDING TO THE VALUE PROVIDED |

*FIG. 16*

LIMITING CONTACT IN A NETWORKED CONTACT CENTER ENVIRONMENT

RELATED PATENT DOCUMENT

This patent document is a continuation under 35 U.S.C. § 120 of U.S. patent application Ser. No. 14/496,137 filed on Sep. 25, 2014 (U.S. Pat. No. 9,294,625), which is a continuation of U.S. patent application Ser. No. 13/552,428 filed on Jul. 18, 2012 (U.S. Pat. No. 8,855,291), which a continuation of U.S. patent application Ser. No. 12/201,639 filed on Aug. 29, 2008 (U.S. Pat. No. 8,243,913); each of these patent documents is fully incorporated herein by reference.

TECHNICAL FIELD

This patent document pertains generally to call centers, and more particularly, but not by way of limitation, to limiting contact with a networked contact center.

BACKGROUND

Traditional contact centers are referred to as call centers, which are designed to enable a company to handle calls from their clients. The calls received from clients may be distributed to multiple call agents according to certain call distribution and handling methodologies. Ideally, a call center is designed to handle calls with minimal client waiting time, minimal dropped calls, even call distribution to agents, and minimal downtime. Any drastic fluctuations in one or more of these criteria may result in loss of business and/or customer satisfaction.

Traditional call centers are normally built to be operated on-premise using proprietary systems with proprietary hardware and software. These on-premise call center systems are generally very costly to maintain. The systems typically require support staff. Furthermore, the systems may be inflexible in the type of applications and hardware that can be supported, limiting the company's ability to upgrade and grow along with any potential increase in demand. Even when the upgrade options are available, they tend to be very costly and may require replacing a current system with another more advanced system, causing further stress to the supporting staff, the agents and the clients.

BRIEF DESCRIPTION OF THE DRAWINGS

Some embodiments are illustrated by way of example and not limitation in the figures of the accompanying drawings in which:

FIGS. 8 and 9 are charts showing example data structures, in accordance with an example embodiment;

FIG. 16 is a chart showing example commands generated by the contact regulation module to affect the front end contact policy, in accordance with an example embodiment.

DETAILED DESCRIPTION

Figure 1:
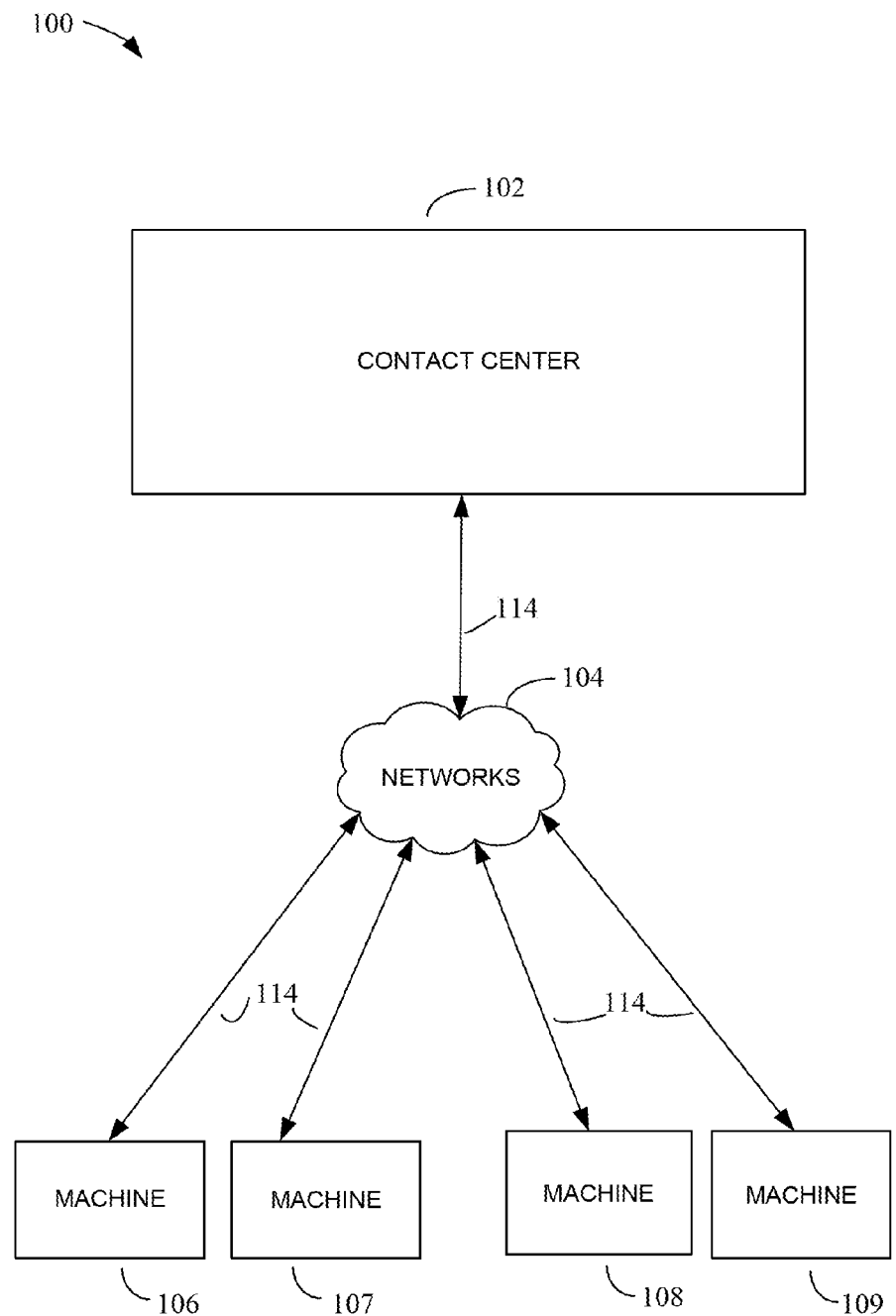
FIG. 1 is a high level diagrammatic representation of an on-demand contact center, in accordance with an example embodiment.

Example embodiments may include a contact module to accept or deny voice calls at a networked contact center. Voice calls may have originated from a customer or a tenant may be directed to the tenant. When a call is received by the network contact system, a dialed number identification service (DNIS) or other identification (ID) service may be mapped to one of multiple platforms (e.g., within a platform layer of the networked contact center) that supports multiple tenants. In various example embodiments, the contact modules are to limit contact with the platform without any feedback from the platform.

Different layers of communication related to a platform (e.g., a DNIS layer, a tenant layer, a platform layer, a carrier layer and/or a site layer) may be associated with a bucket value that represents a number of calls that may be accepted within a specific time-interval. For each call, the contact modules may reference the bucket values to determine whether the call is to be allowed to reach the platform. After a call is allowed, bucket values may be decremented by a selected value. After a specific time interval, the bucket values may be incremented by a selected value.

In some example embodiments, the contact modules are to enforce a contact policy that is based on feedback from platforms. In an example embodiment, bucket values are adjusted based on feedback from platforms and the contact modules are to use the adjusted bucket values to determine whether a call is to be blocked or allowed to reach a platform. For some example embodiments, the time interval for incrementing bucket values may be adjusted to affect how the contact module enforces the contact policy.

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the present subject matter. The embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Contact Center

FIG. 1 is a block diagram showing an example networked contact center 100, in accordance with an example embodiment. FIG. 1 is shown to include a contact center 102 that is communicatively coupled with networks 104, via transmission media 114. Also communicatively coupled with the networks 104 via the transmission media 114 are machines 106-109. One or more of the machines 106-109 may be used by call agents or call supervisors associated with a company (also referred to as a tenant). One or more of the machines 106-109 may be used by customers or potential customers of the company.

The networks 104 may be used to communicatively couple the contact center 102 with the machines 106-109. In an example embodiment, networks 104 include the Internet and a public switched telephone network (PSTN). Other types of networks may be included within the networks 104 without departing from the claimed subject matter. The transmission media 114 may include any transmission media appropriate for supporting the networks 104. In an example embodiment, the transmission media 114 may include one or more of optical fiber, twisted pairs and wireless media. Other transmission media not described may also be used.

Contact made between the contact center 102 and the various machines 106-109 may include various modes of communications (e.g., electronic communications) that may be digitally encoded, composed of analog signals and/or include a combination of digital and analog communication. Some example types of contact may include communications made via Voice Over Internet Protocol (VOIP), analog telephone, online chat, text messaging, electronic mail (email), video conferencing, screen sharing, web conferencing and file sharing, radio broadcast, etc. It is to be appreciated that example forms of communication are provided herein to illustrate types of contact and not to limit the meaning of contact to certain forms of communication.

The contact center 102 may perform various contact-related tasks (described in more detail below), on behalf of one or more tenants. The contact center 102 may be implemented in software, hardware or a combination of both software and hardware. The contact center 102 may comprise contact center machines (not shown) that execute instructions to perform the various contact related tasks (e.g., call distribution, call routing, call prioritizing, call transferring, etc.). One or more of the contact center machines may include interface hardware to communicate with the machines 106-109 via the transmission media 114 and the networks 104. It may be noted that the number of customers, agents or supervisors (and e.g., machines used by the customers, agent and supervisors) that communicate with the contact center 102 may be significantly increased when the number of tenants supported by the contact center 102 also increases. One or more of the machines 106-109 may access data associated with the one or more tenants. The data may include, for example, tenant-specific call configuration, agents' identification, supervisors' identification, call recordings, call statistics, etc. For some example embodiments, there may be multiple instances of the same data that may be used as redundant data and for recovery purposes.

Tenant

A tenant is an entity (e.g., a company, an employer, team, division, department, or any other entity having agents and customers, etc.) that seeks to address contact made by other entities (e.g., customers, employees, associates, etc.) with which the tenant has a relationship. To help respond to such contact, an example tenant may use the contact center 102 to receive the contact, organize the contact, allocate the contact, transmit the contact and to perform other contact center related services for the benefit of the tenant. In addition to using the contact center 102, a tenant may look to yet further entities (e.g., agents, consultants, business partners, etc.) to help address the various contact referred to above (e.g., contact from the customers, associates, etc.).

Entities such as, for example, agents and customers may transmit and/or receive communications using the machines 106-109. The machines 106-109 may include interface hardware (not shown) and software to transmit and/or receive communications via the transmission media 114 to and/or from the networks 104 and the contact center 102. It is to be noted that the machines 106-109 may represent different types of machines (e.g., personal computers (PCs), mobile devices, telephones or any other network device). In an example embodiment, an entity associated with the machine 106 is a tenant's agent and a different entity associated with the machine 108 is the tenant's customer. In various example embodiments, on behalf of the tenant, the agent using the machine 106 may communicate via the networks 104 and the contact center 102 with the customer that is using the machine 108.

Contact Center Functional Modules

Figure 2:
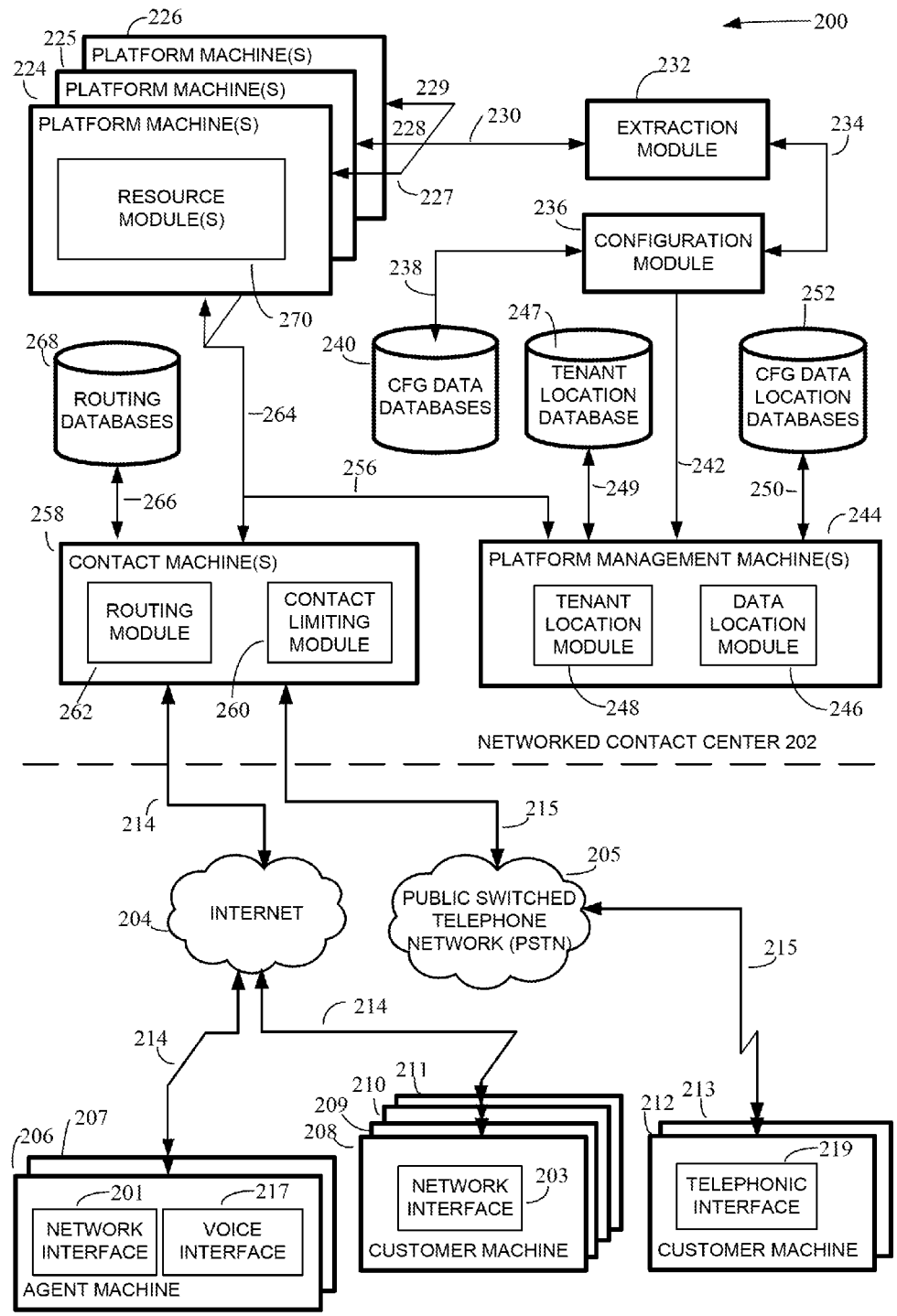
FIG. 2 is a further diagrammatic representation of an on-demand contact center, in accordance with an example embodiment.

FIG. 2 is a block diagram illustrating a network 200, in accordance with an example embodiment. The network 200 is shown to include an example networked contact center 202 communicatively coupled with agent machines 206 and 207 and customer machines 208-211 via the transmission media 214 of the Internet 204. The example networked contact center 202 is further communicatively coupled with customer machines 212 and 213 via the transmission media 215 of the PSTN 205.

Although the current example may illustrate customers and agents associated with one tenant, it is to be understood that the networked contact center 202 may be configured to support or host multiple tenants (and therefore may also be referred to as a hosted networked contact center or just a hosted contact center). For some example embodiments, the tenants may not need to install any call-distribution system on-premise. To host these multiple tenants, the networked contact center 202 may include multiple platforms and databases to store configurations specific to each tenant. The networked contact center 202 may also implement redundancy and recovery schemes to reduce system down time.

Figure 3:
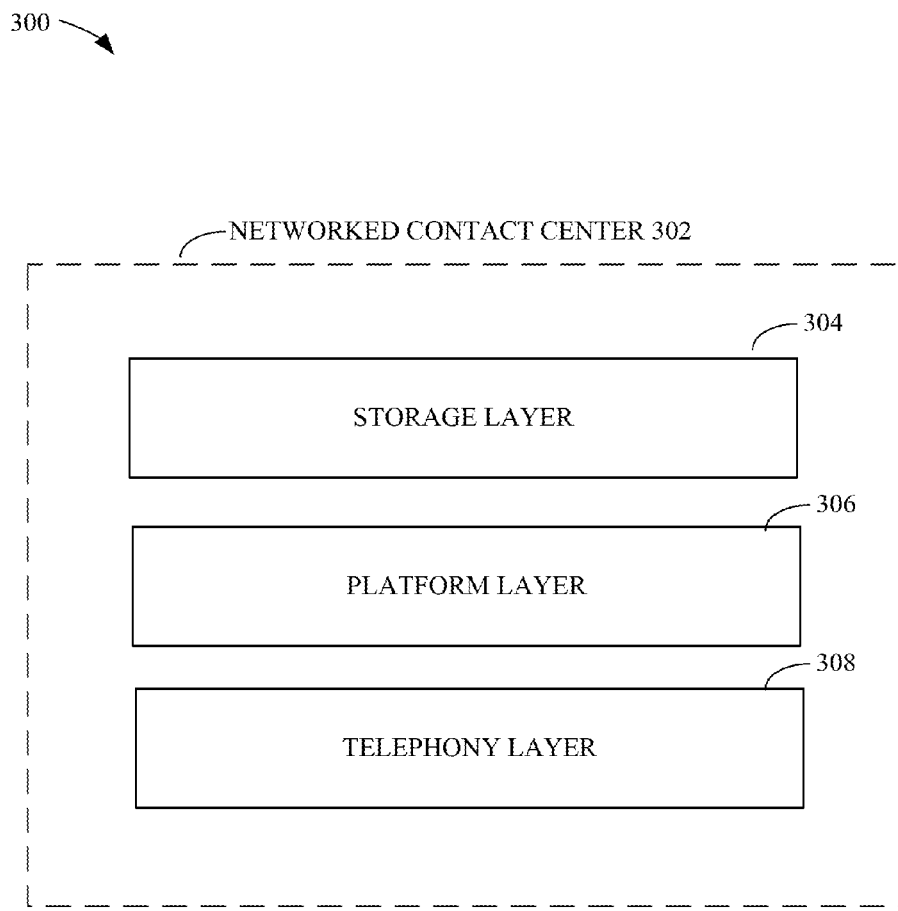
FIG. 3 is a block diagram illustrating a further network, including a networked contact center, organized into layers, in accordance with an example embodiment.

FIG. 3 is a block diagram illustrating a further network 300 including networked contact center 302 organized into layers, in accordance with an example embodiment. The networked contact center 302 may be substantially similar to the networked contact center 202 of FIG. 2. The networked contact centers 202 and 302 may be organized into multiple logical groups or layers. There may be a storage layer 304, a platform layer 306 and a telephony layer 308. For some example embodiments, the telephony layer 308 may be responsible for receiving calls that come into the networked contact centers 202 and 302. Depending on the dialed number associated with the call, the telephony layer 308 distributes the call to an appropriate platform in the platform layer 306. For some example embodiments, each platform in the platform layer 306 may be associated with one or more machines (also referred to as platform machines). Each platform machine (e.g., server) may support one or more tenants.

For some example embodiments, each tenant may be associated with two or more platforms. A first platform may be used for a tenant as an active platform, and one or more other platforms may be used for the tenant as an inactive platform that is available in the event the active platform becomes unavailable. A tenant may use multiple platforms as inactive platforms available to provide resources to the tenant in the case of a software failure, hardware failure or platform unavailability due to administrator activities, etc. Incoming calls distributed to a tenant may always be directed to the active platform unless the tenant is reconfigured to direct the incoming calls to an inactive platform. For some example embodiments, the inactive platform is operational and the active platform is operational, even when all calls are being processed by the active platform. This can be advantageous when there are problems with the active platform since switching the operations to the inactive platform may not cause too much delay in the call handlings associated with the tenant. The inactive platform may be re-classified as an active platform at the time operations are switched.

For some example embodiments, the multiple platforms in the platform layer 306 may share the same data in the storage layer 304. The storage layer 304 may be associated with databases and associated database machines. The storage layer 304 may itself be partitioned into multiple images for redundancy and recovery and for efficient access. For some example embodiments, mappings may be used to relate a tenant on a particular platform to the tenant's data in the storage layer 304.

Thus, the contact centers 102, 202 and 302 of FIGS. 1-3 may include logic to receive calls, to determine to which of the multiple supported tenants the calls belong, to distribute the calls to the appropriate platform, and to determine where the data associated with the tenant may be found.

Using the organization described above, the contact centers 102, 202 and 302 may be easily upgraded and maintained with little or minimal impact to the tenant. For example, a tenant may be operating with an inactive platform while the active platform is upgraded from one software level to another software level. Once the upgrade is completed, operations may be switched back to the active platform. Similarly, because both the active platform and the inactive platform share the same data in the storage layer 304, switching from the inactive platform to the active platform can be accomplished with minimal impact to the tenant and system availability. It may be noted that some calls may be affected during the switch; however, as is typical with telephone calls, the customers may re-dial or call the tenant again. It may be likely that the re-dialed calls may be received by the example contact center 102 after the switch is complete.

Referring to FIG. 2, platform machines 224-226 may be communicatively coupled with an extraction module 232 via communication channels 227-229, respectively, and communication channel 230. Platform machines 224-226 are further communicatively coupled to contact machine(s) 258. The contact machine(s) 258 are communicatively coupled with the routing databases 268 via the communication channel 266.

Platform management machine(s) 244 are shown to be communicatively coupled with configuration data location databases 252 via communication channel 250, the tenant location database 247 via communication channel 249 and with the contact machine(s) 258 and platform machines 224-226, respectively, via the communication channels 256 and 264. The platform management machine(s) 244 are further shown to be communicatively coupled with the configuration module 236 via communication channel 242, while the configuration module 236 is communicatively coupled with the extraction module 232 and the configuration data databases 240 via communication channels 234 and 238, respectively. The machines and modules of FIG. 2 are to be described in further detail with respect to FIG. 4, which follows.

Figure 4:
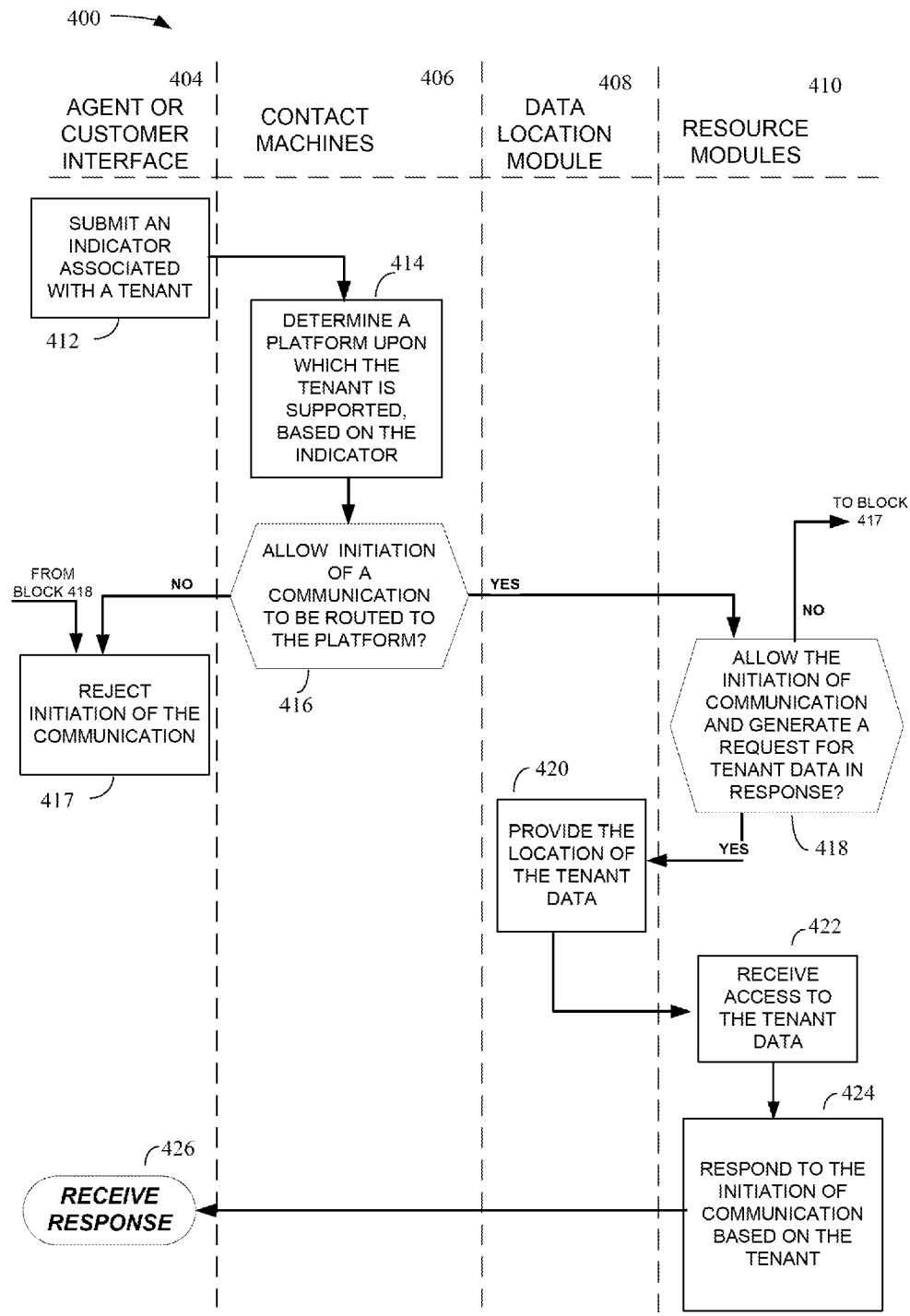
FIG. 4 is a flow diagram illustrating example actions performed by various on-demand contact center components in response to agent or customer contact, in accordance to an example embodiment.

FIG. 4 is a flow diagram 400 showing example actions performed by various components of a contact center for responding to agent or customer contact, in accordance with an example embodiment. In FIG. 4, each column represents a lane in which action(s) are carried out. Actions in lanes 404, 406, 408 and 410 may be performed by certain machines and/or modules shown in FIG. 2. It may be noted that a module may represent software, hardware and/or a combination of software and hardware used to implement logical constructions and/or to process instructions. Although shown in separate lanes, one module may be included in, or composed of, one or more of the other modules.

The flow diagram 400 may begin at block 412 with an agent or customer submitting an indicator associated with a tenant along with an initiation of communication. In FIG. 2, the customer machine 212 is shown to include a telephonic interface 219 (e.g., a telephone with a handset). In an example embodiment, a customer seeking customer support from a tenant dials a tenant's phone number on a telephone to place a call (e.g., initiation of communication) to the contact center over the PSTN. In an example embodiment, the telephone number itself serves as an indicator of the tenant whose attention is sought by the customer.

Referring to FIG. 2, the customer machine 208 is shown to include a network interface 203 (e.g., a web browser) with which a customer may, for example, submit a chat request to the networked contact center 202 over the Internet to receive, for example, technical support from a tenant. An agent of the tenant or a contact supervisor may also contact the tenant. In an example embodiment, an agent using the agent machine 206 uses the network interface 201 to log on to an agent network server hosted by the networked contact center 202 to notify the networked contact center 202 that the agent is available to be contacted by customers. In some example embodiments, the agent may use the voice interface 217 to speak with a customer or another agent.

In various example embodiments, the indicator submitted at block 412 of FIG. 4 is received by the contact machines(s) 258 of FIG. 2. In FIG. 2, the contact machine(s) 258 are shown to include a routing module 262 and a contact limiting module 260. The routing module 262 may route contacts to a certain platform depending on the tenant indicated by the indicator (e.g., a phone number, username/password or any other indicator designating a tenant). The example contact limiting module 260 may regulate incoming contact with the networked contact center 202.

At block 414, the routing module 262 within the contact machines 258 of FIG. 2 may determine a platform upon which the tenant is supported based on the indicator received from the agent or customer at block 412. In an example embodiment, in FIG. 2, the routing module 262 accesses the routing databases 268 via communication channel 266 to associate an indicator with a tenant and a platform. In some example embodiments, the contact machine(s) 258 submit a request, via the communication channel 256 to the platform management machine(s) 244 to determine a platform associated with the indicator (e.g., and a tenant corresponding to the indicator).

At decision block 416, the example flow diagram 400 includes the example contact limiting module 260 within the contact machines 258 of FIG. 2 determining whether to allow the initiation of communication (e.g., a telephone call from a customer) to be routed to a platform (e.g., the platform machine(s) 224).

The contact limiting module's 260 determination of whether to allow the initiation of communication may include referencing a current allowance of contact or communication (e.g., a bucket value, described in more detail below) to be received by a particular communication layer or platform (e.g., within the platform machines 224) in a fixed period of time. In some example embodiments, each platform may vary a maximum allowance of contact for a period of time or vary the period of time based on an availability of platform resources. In some example embodiments, when contact directed to a platform is received by the contact machines 258 and the current allowance is less than or equal to zero, the contact limiting module 260 may reject initiation of the communication as shown in block 417 of FIG. 4. When the contact directed to the platform is received by the contact machines 258 and the current allowance is greater than or equal to one, the contact limiting module 260 may allow the initiation of communication to be routed to the platform as shown between blocks 416 and 418 of FIG. 4.

Alternatively or additionally, determination of whether to allow the initiation of communication may be made by a platform at block 418 after the contact limiting module has allowed the initiation of communication to be routed to the platform at block 416. In various example embodiments, a platform may reject the initiation of communication based on availability of platform resources or other conditions warranting a rejection. Such a rejection is represented by block 417.

In an example embodiment, in FIG. 2, a platform may allow the initiation of communication from the contact machines(s) 258. Example resource module(s) 270 located on the platform machine 224 and located on the other platform machines 225-226, may include various modules that provide services for multiple tenants. Example resource module(s) 270 may include interaction routers, interactive voice recordings, scripting, agent network server, media control and other contact center related services, etc.

In an example embodiment, the initiation of communication is a voice call from a customer seeking help with installing a water heater; the tenant is in the business of providing technical support for refrigerator installations and water heater installations. The tenant employs some agents who address questions about refrigerator installations while the tenant's other agents address questions about water heater installations.

At block 418, the flow diagram 400 includes the resource module(s) 270 of FIG. 2 allowing the initiation of communication and generating a request for data associated with a tenant, based on the initiation of communication. In the appliance installation example, the resource module(s) 270 request tenant data to be used to teleprompt the customer, prompting the customer to press 1 on their telephone dial for refrigerator installation support or to press 2 for water heater installation support.

Example platform machine(s) 224, 225 and 226 in FIG. 2 may initially request the data associated with the tenant from the extraction module 232 and the configuration module 236. In an example embodiment, to locate data for data access, the resource module(s) 270 may use a different addressing system than the configuration module 236 uses to locate and access the same data. In some example embodiments, the extraction module 232 translates requests from the platform machine(s) 224, 225, 226 to allow the configuration module 236 to understand the request. The configuration module 236 may access the requested data in the configuration data databases 240 and relay the requested data to the resource module(s) 270 on a set of platform machine(s) (e.g., platform machine(s) 224) via the extraction module 232.

The configuration module 236 may not initially locate the requested data in the configuration data databases 240. In some example embodiments, the configuration module 236 may request the location of the requested data from the data location module 246 that may be located within the platform management machine(s) 244.

At block 420, the flow diagram 400 may include the data location module 246 of FIG. 2 providing the location of the requested data (e.g., the location within the configuration data databases 240) to the configuration module 236. The configuration module 236 may then access the requested data to provide it to the resource module(s) 270 via the extraction module 232.

At block 422 of the flow diagram 400, the example resource module(s) 270 of FIG. 2 receive access to the requested data (e.g. tenant data). With access to the particular tenant data, an example resource module 270 may generate a particular response to the initiation of communication received from the agent or customer.

At block 424 of the flow diagram 400, the resource module(s) 270 of FIG. 2 respond to the initiation of the communication based on the data (e.g., the tenant data). The agent or customer that initiated communication may receive the response where the flow ends at terminal 426. In the appliance installation support example, the response to the initiation at terminal 426 may be the tenant's teleprompter asking the customer to indicate the nature of the call.

Contact Limiter

Figure 5:
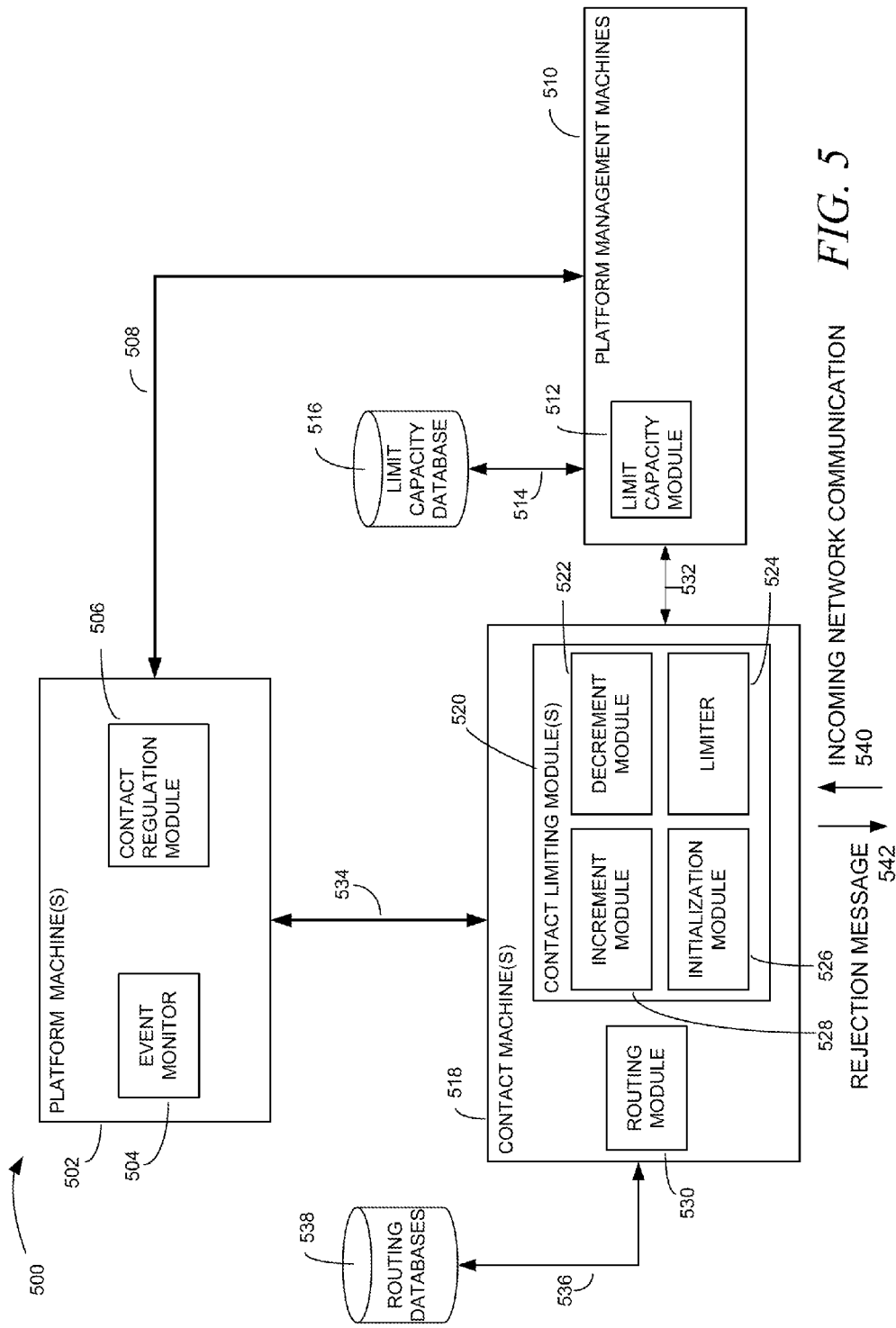
FIG. 5 is a block diagram showing an example network contact center, in accordance with an example embodiment.

FIG. 5 is a block diagram showing a further example network contact center 500, in accordance with an example embodiment. The network contact center 500 is shown to include the platform machines 502 communicatively coupled to platform management machines 510 via communication channel 508. The platform management machines 510 are shown to be communicatively coupled with contact machines 518 via the communication channel 532. The platform management machines 510 are shown to be communicatively coupled to a limit capacity database 516 via the communication channel 514, while the contact machines 518 are shown to be communicatively coupled to the routing databases 538 via the communication channels 536. The platform machines 502, the platform management machines 510 and the contact machines 518 may be substantially similar to the platform machines 224-226 in FIG. 2, the platform management machines 244 and contact machines 258.

The contact machines 518 are shown to include a routing module 530 and contact limiting modules 520. The routing module 530 is to receive incoming network communication 540 and determine a tenant associated with the incoming network communications 540.

The contact limiting modules 520 are shown to include a decrement module 522, a limiter 524, an initialization module 526 and an increment module 528. The limiter 524 is to access the routing databases 538 via the communication channel 536 to determine whether the network contact center (e.g., specifically whether a tenant and corresponding, platform within a cluster of platforms) has capacity to accept an incoming network communication 540.

In various example embodiments, the contact limiting modules 520 may be referred to as front-end limiting modules at least in part because the contact limiting modules 520 may limit contact with the platform machines 502 (e.g., including back-end modules discussed in further detail below) such as by allowing or denying contact and in the example case of denying contact, generating a rejection message 542 in response to incoming network communication 540.

In some example embodiments, each communication layer may be thought of as having a bucket of contact parameter values (e.g., call rate values). An example call may be accepted if a bucket corresponding to a communication layer currently has a contact parameter value that is greater than zero, which may indicate a maximum number of calls to be allowed over the communication layer within a fixed period of time. It may be noted that the contact parameter value may be adjusted based on various factors discussed below.

The limiter 524 may generate a rejection message based on determining that an incoming network communication 540 is not to be routed to the platform machines 502. In an example embodiment the rejection message 542 is transmitted to the source of incoming network communication 540.

The routing databases 538 may include a data structure to store contact parameter values referenced by the limiter 524 to determine whether the incoming network communication 540 should be routed to the platform machines 502. For some example embodiments, the routing databases 538 include data structures, such as tables that the limiter 524, may select to store active contact parameter values. In various example embodiments, a contact parameter value includes a contact rate value that defines a quantity of network communications that the network contact center 500 may accept within a specific quantity of time. For some example embodiments, contact parameter values may define a frequency with which other contact parameter values are updated (e.g., incremented as described in more detail below).

In some example embodiments, a decrement module 522 is to access the routing databases 538 to decrement a contact parameter value by one or more units when the limiter 524 allows an incoming network communication 540 associated with a particular tenant to be routed to the platform machines 502. The increment module 528 may increment contact parameter values within the data structures of the routing databases 538. For some example embodiments, as will be described further, the increment module 528 increments a contact parameter value by a specific number of units within a specific time interval after a call is accepted.

The platform machines 502 are shown to include an event monitor 504 and a contact regulation module 506 (e.g., the back-end contact regulation module). The event monitor 504 may monitor events associated with network contact occurring on the platform machines 502. Example events may include contact statistics, system resource events or other activity that may be related to or be affected by network communication on the platform machines 502. Some example event monitors 504 monitor levels associated with operation of resource modules 270, running on the platform machine(s) 224, both of FIG. 2.

The contact regulation module 506 may subscribe to statistics associated with certain events that may be kept by the event monitor 504 and the contact regulation module 506 may monitor the statistics generated by the event monitor 504. The contact regulation module 506 may analyze information from the event monitor 504 to detect indications of resource overload related to incoming network communication 540 to the platform machines 502. In some example embodiments, when the contact regulation module 506 detects certain levels of activity within the platform machine(s) 502, it may vary contact parameters, generate commands and transmit commands to the limit capacity module 512 to regulate contact.

In some example embodiments, the limit capacity database 516 includes a data structure that is substantially similar to the data structures located within the routing databases 538. In some example embodiments, at system startup, the initialization module 526 may access the example data structure within the limit capacity database 516 and copy the example data structure to the routing databases 538 to establish initial contact parameter values.

As disclosed above, the limiter 524 may be referred to as a front-end limiter 524 while the contact regulation module 506 may be referred to as a back-end contact regulation module 506. The back-end contact regulation module 506 may monitor events on the platform machines 502 and make changes to contact parameter values within the database 516 based on the events. In an example embodiment, a change to a contact parameter value may result in allowing an increased contact rate, a decreased and/or stopping all incoming contact. The adjusted contact parameter values, however may not affect the limiter's 524 acceptance or rejection of incoming network communication 540 until the contact regulation module 506 sends a particular command to the limiter 524 via the communication channel 534. In various example embodiments, certain commands may cause the limiter 524 to replace one or more contact parameter values within the routing databases 538 with the adjusted contact parameter values from the limit capacity database 516.

With regard to the limit capacity database 516, the contact regulation module 506 may send commands to the limit capacity module to vary one or more contact parameter values within the limit capacity database 516, based on events occurring on the back-end platform machines 502. In an example embodiment, the contact regulation module 506 may adjust contact limiting on the front end by sending further commands to the limiter 524 to vary one more contact parameter values within the routing databases 538. For example, the contact regulation module 506 may send a command to the limiter 524 of the contact machines 518 to copy the data structure within the limit capacity database 516, which may have been varied by the contact regulation module 506.

In an example embodiment, the limiter 524 may deactivate the replaced contact parameter values so they are not referenced when the contact limiter 524 determines whether to accept an incoming network communication 540; and activate the adjusted contact parameter values so that they are considered when the contact limiter determines whether to accept the incoming network communication 540.

Figure 6:
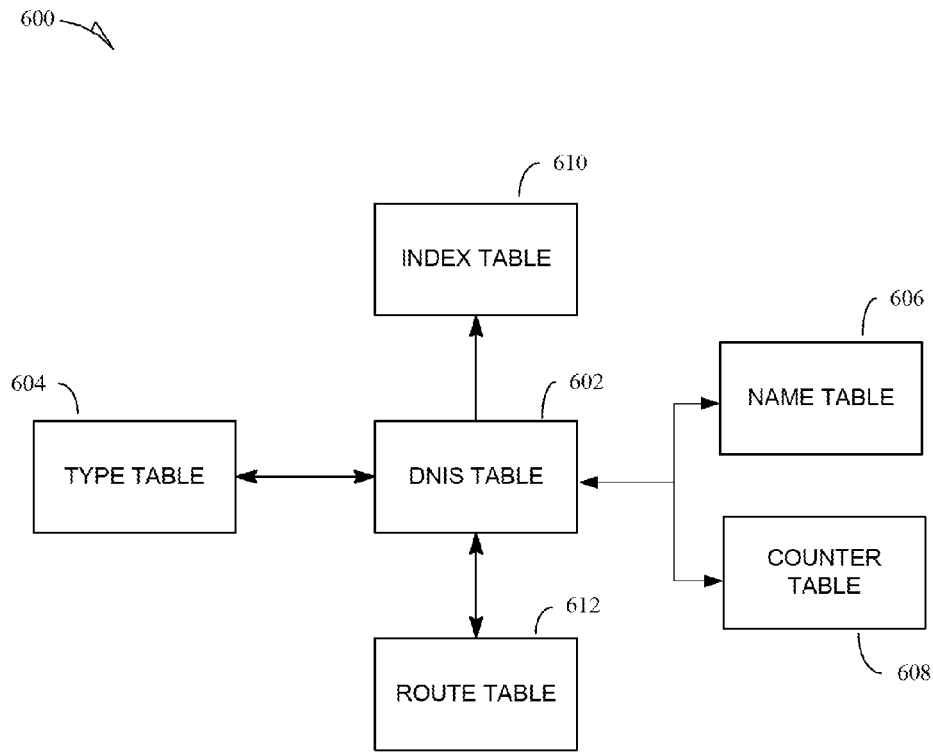
FIG. 6 is a high-level entity relationship diagram illustrating various tables that may be maintained within the routing databases, in accordance with an example embodiment.

FIG. 6 is a high-level entity relationship diagram, illustrating various tables 600 that may be maintained within the routing databases, in accordance with an example embodiment. The tables 600 are shown to include a DNIS table 602, type table 604, a name table 606, a counter table 608, an index table 610 and a route table 612. In an example embodiment, the limiter 524 of FIG. 5 may access the tables 600 to determine whether incoming network communication 540 should be routed to the platform machines 502. The contact regulation module 506 may access substantially similar tables 600 within the limit capacity database 516 in FIG. 5.

Figure 7:
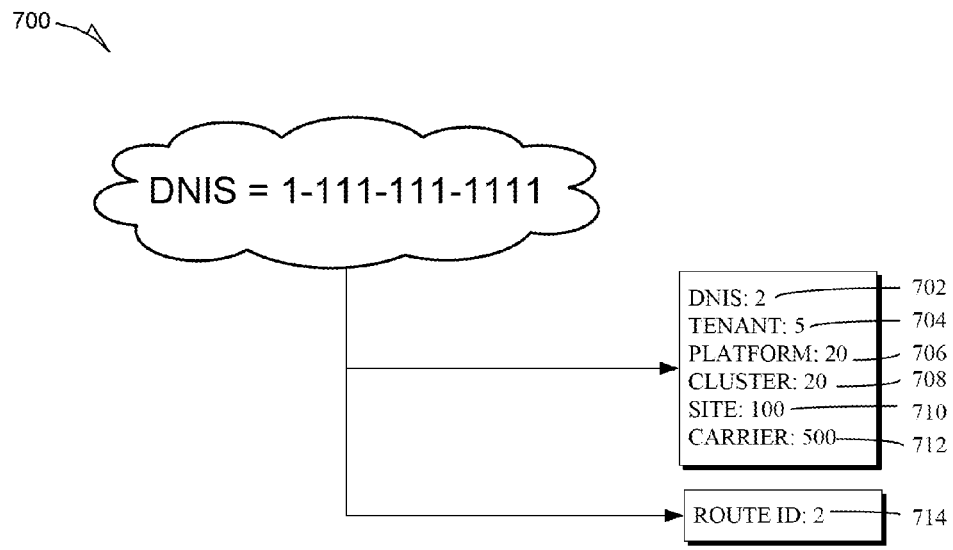
FIG. 7 is a graphical diagram showing example relationships between a communication identification (ID) and various communication layers in the networked contact center.

FIG. 7 is a graphical diagram showing example relationships 700 between a DNIS and various communication layers in the networked contact center 500 of FIG. 5. Each communication layer may relate to a corresponding contact parameter value and a time interval for which the contact parameter applies. In example embodiments, the time interval value is a configurable number of seconds and a contact parameter value may include a call rate value. Referring to FIG. 7, a DNIS 702 may receive two calls for every time interval, a tenant 704 may receive five calls per time interval, a platform 706 may receive 20 calls per time interval, a cluster 708 may receive 20 calls per time interval, a site 710 may receive 100 calls per time interval and a carrier 712 may receive 500 calls per time interval.

In an example embodiment, the route ID 714 is an ID number associated with a particular platform. For example, platform resources such as voice machines running on the resource modules 270 of FIG. 2 may correspond with the route ID 714.

FIGS. 8 and 9 are charts showing example data structures 800 and 900, in accordance with an example embodiment. The tables 600 in FIG. 6 may be used by the limiter 524 in FIG. 5 to implement a data structure 800 of FIG. 8 and the data structure 900 of FIG. 9.

Referring to FIG. 6, the DNIS table 602 may include a list of DNIS numbers associated with tenants supported by a platform. The type table 604 may associate each communication layer with a type index. For example, in FIG. 8, a tenant corresponds to type two as shown in columns 805-806, while a platform corresponds to type three a shown in column 807. The name table 606 includes a name for each communication layer. For example, in the data structure 800 the name of DNIS 3 in column 804 is 1-800-111-3333, the name of tenant 2 in column 805 is portishead and the name of tenant 2 in column 806 is morcheeba. The counter table 608 may associate a contact parameter value with each communication layer. For example, DNIS 2 in column 803 shows that 50 calls to that number may be received within the given time interval and cluster 1 in column 808 shows that 1000 calls may be received by cluster 1 within the given time interval. The index table 610 is to associate a communication layer with the layer above it, if any. For example DNIS 1 in column 802 of FIG. 8 shows parent index 4 which corresponds to tenant 2 in column 806.

The data structure 900 is to associate a route ID with a platform (e.g., a platform resource running on a platform machine). The data structure 900 may be referenced to determine whether a network and incoming network communication will be allowed to access a particular platform. FIGS. 8 and 9 are to be discussed in further detail with respect to FIGS. 13 and 14.

Figure 10:
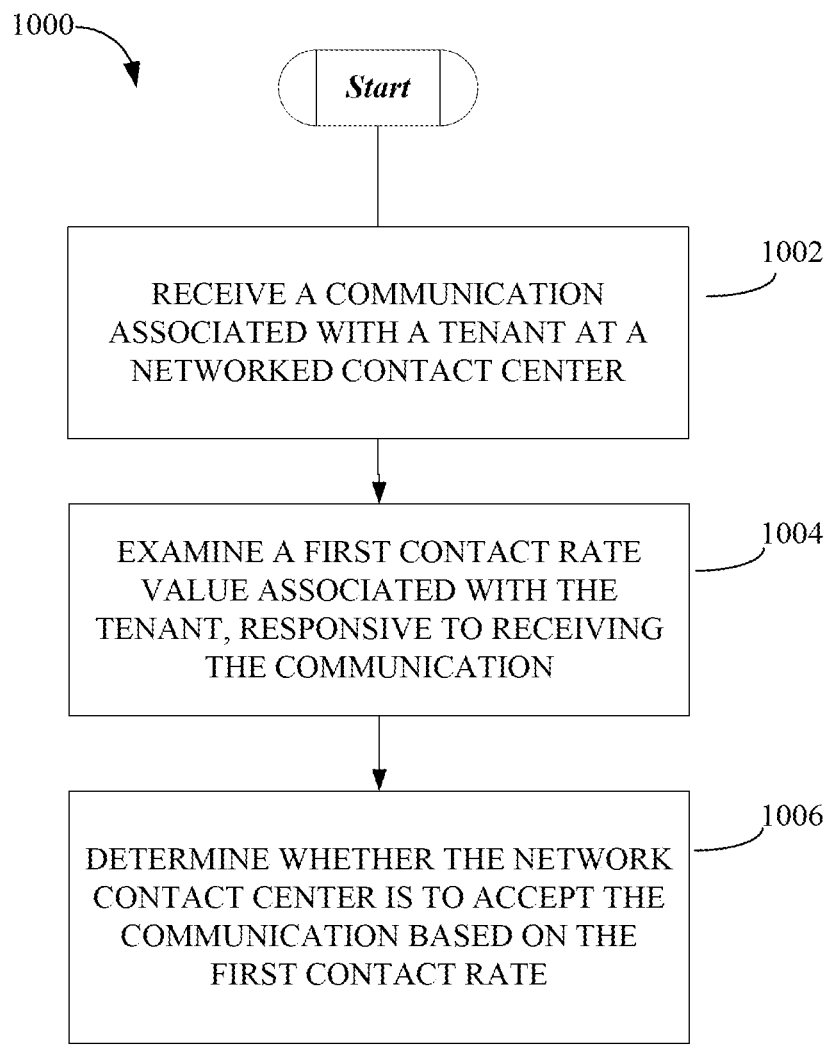
FIG. 10 is a flow diagram showing an example method for limiting contact to a network contact center, in accordance with an example embodiment.

FIG. 10 is a flow diagram showing an example method 1000 for limiting contact to a network contacts center, in accordance with an example embodiment. The example method may be implemented by the limiter 524 of FIG. 5. At block 1002, the method 1000 may include receiving a communication associated with a tenant at the network contact center. As disclosed above with respect to FIG. 5, the contact limiting modules 520 including the limiter 524 may receive incoming network communications 540 from a customer or agent. Although the example embodiment is presently disclosed in reference to a voice call it may be noted that incoming network communication 540 may include a chat communication, an e-mail communication or any other electronic communication without departing from the present subject matter.

At block 1004, the example method 1000 includes examining a first contact rate value associated with a tenant, responsive to receiving the communication. For some example embodiments, the first contact rate value may represent a quantity of contact within a first time interval. In various example embodiments, the limiter 524 of FIG. 5 is to access the routing databases 538 to access the tables 600 of FIG. 6. In accessing the tables, the limiter 524 may associate the incoming DNIS in the table 602 of FIG. 6 with a contact rate value within the counter table 608. In some example embodiments, the limiter 524 is to determine whether an incoming communication shall be routed to the platform machines 502 of FIG. 5 based on multiple contact rate values corresponding to the communication layers disclosed above. The limiter 524 may access the parent index table 610 of FIG. 6 to determine the communication layer above the DNIS communication layer. A corresponding tenant may be then associated with a contact rate value by referencing the counter table 608.

At block 1006, the method 1000 may include determining whether the network contact center is to accept the communication based on the first contact rate as explained above with respect to FIG. 5.

For some example embodiments, the limiter 524 of FIG. 5 may determine that the networked contact center 500 is to accept an incoming network communication 540 and based on accepting the network communication 540 the decrement module 522 is to access the counter table 608 of FIG. 6 to decrement a contact parameter value (e.g., such as a contact rate value) for each communication layer.

In example embodiments, the increment module 528 of FIG. 5 increments the contact rate value by a quantity after the passage of a selected time interval. In one example embodiment, the time interval is two seconds. The quantity may be based on a percentage of a maximum allowable quantity of contact with a particular communication layer in a given period of time.

In some example embodiments, the limiter 524 of FIG. 5 is to reject incoming network communication 540 and to generate a rejection message 542 to be transmitted to the source of the incoming network communication 540. The rejection message sent to the source of incoming network communication 540 may be a SIP message (e.g., error 486 "busy here" if the phone number is recognized and error 503 "service unavailable" if the phone number is unrecognized).

Figure 11:
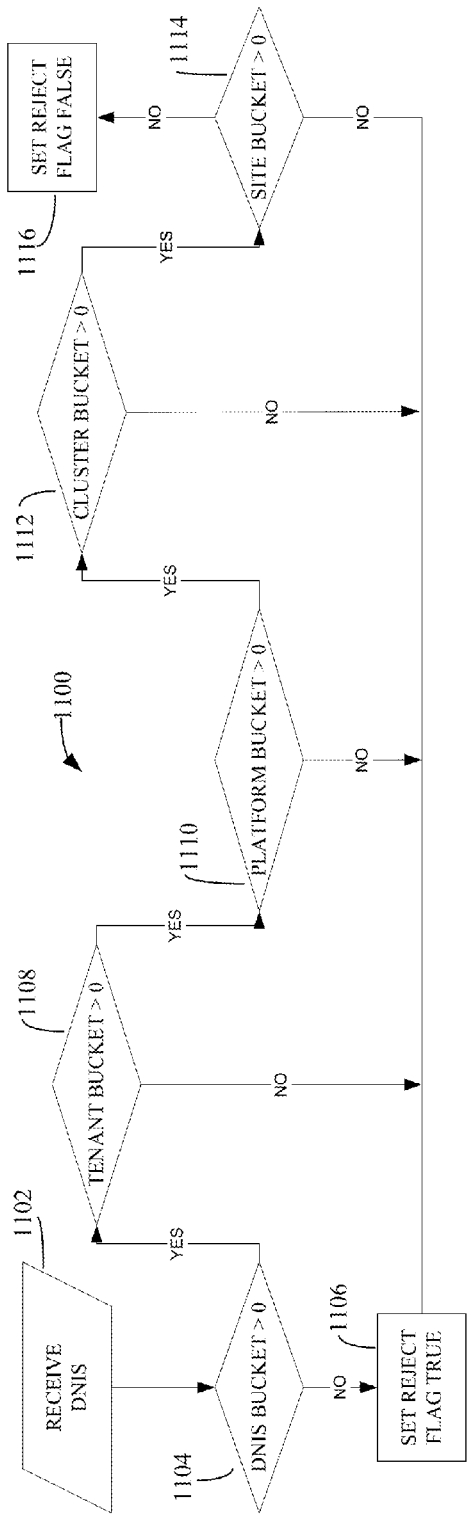
FIG. 11 is a flow diagram illustrating a further example method for examining a contact rate value, in accordance with an example embodiment.

FIG. 11 is a flow diagram illustrating an example method 1100 for examining a contact rate value, in accordance with an example embodiment. The method 1100 may be a sub-method of block 1004 of FIG. 10. At block 1102, the method 1100 may include receiving a DNIS at a networked contact center.

At decision block 1104, the example method 1100 may include determining whether the DNIS bucket e.g., the contact rate value is greater than zero. Referring to FIG. 8, column 802 may be taken as an example for the DNIS 1. The counter for DNIS 1 may be determined to be 10, which is greater than zero. In other example embodiments that bucket value may be less that zero.

The example method 1100 may continue at block 1106 at which a reject flag is set to true in the example embodiment if the DNIS bucket is greater than zero.

The method may continue at decision block 1108 in which it is determined whether a tenant bucket is greater than zero. In FIG. 8, for the DNIS 1 in column 802, it is shown that a parent index is four which leads to tenant 2 in column 806, which has an index of four. In an example embodiment, decision block 1108 includes determining whether the tenant 2 in column 806 has a bucket or counter value greater than zero. As shown in column 806, the counter for the tenant 2 is 40 which is greater than zero. Had the counter or bucket not been greater than zero, the example method 1100 would continue at block 1106 where the rejection flag is set to true when a tenant bucket is not greater than zero.

The method may proceed to decision block 1110 in which it is determined whether a platform bucket is greater than zero. In FIG. 8, column 806, it can be seen that the parent index for the tenant 2 is five which leads to column 807 where the platform 1 has an index of five. If the platform 1 bucket was not greater than zero, the method may continue at block 1106 in which a reject flag is set to true if the platform bucket is not greater than zero. If the platform 1 bucket is greater than zero, the method name continues at block 1112 at which it is determined whether a cluster bucket is greater than zero.

The method 1100 continues, as described above, until a last site bucket at decision block 1114 is examined. If the site bucket at decision block 1114 is determined to be greater than zero, the example method 1100 may conclude at block 1116 with a reject flag set to false. If the site bucket is not greater than zero at decision block 1114, the method may conclude at block 1106 with a reject flag being set to true.

Figure 12:
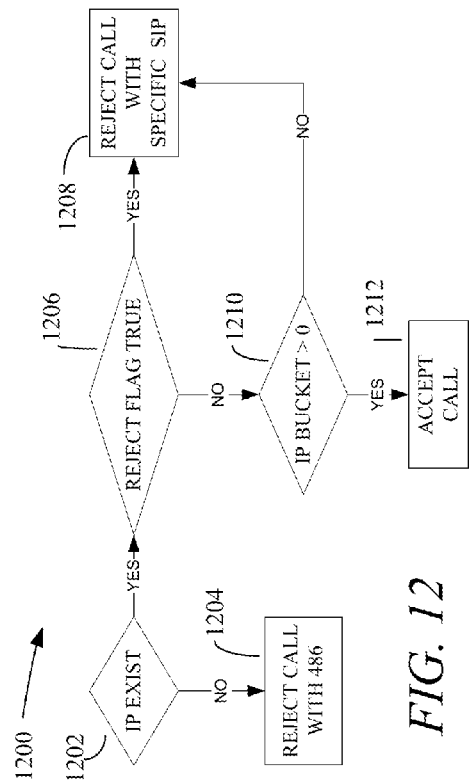
FIG. 12 is a flow diagram showing an example method for determining whether a network contact center is to accept a communication based on a contact rate value, in accordance with an example embodiment.

FIG. 12 is a flow diagram of an example method 1200 for determining whether a networked contact center is to accept a communication based on a contact rate value, in accordance with an example embodiment. An incoming network communication may include a DNIS and an IP ID. The DNIS may correspond to a particular tenant and the IP ID may correspond to a particular platform resource that may also be associated with a tenant. An example platform resource may include a voice machine that may automatically process incoming calls from a customer. The example method 1200 may be a sub-method of block 1006 of FIG. 10.

At block 1202, the example method 1200 includes determining whether an IP ID exists in a communication. If an IP ID does not exist, the block 1204 may include rejecting a call with a SIP message 1204 (e.g., error 486), which may result in a busy signal at the caller's receiver. If it is determined at decision block 1202 that an IP ID does exist, at the decision block 1206 it may be determined whether a reject flag is true. The determination in decision block 1206 may include determining whether a reject flag was set to true in block 1106 of FIG. 11.

If the reject flag is determined at decision block 1206 to be set to true, block 1208 may include rejecting a call with a specific SIP error message. In various example embodiments, the specific SIP message depends on whether a phone number or DNIS is recognized or not. If the phone number is recognized the call may be rejected with SIP error message 486 but if the call is not recognized the call may be rejected with an error 503 SIP message.

If it is determined at decision block 1206 that the reject flag is not set to true, the decision block 1210 may include determining whether an IP bucket is greater than zero. Referring to FIG. 5, band columns 902-905 of FIG. 9, the limiter 524 of FIG. 5 may reference the counter table 608 of FIG. 6 to determine that 10,000 calls may be received in specific time interval. In such examples where it is determined at decision block 1210 that the IP bucket is greater than zero, a call may be accepted at block 1212, otherwise a call may be rejected at block 1208 as previously described.

Figure 13:
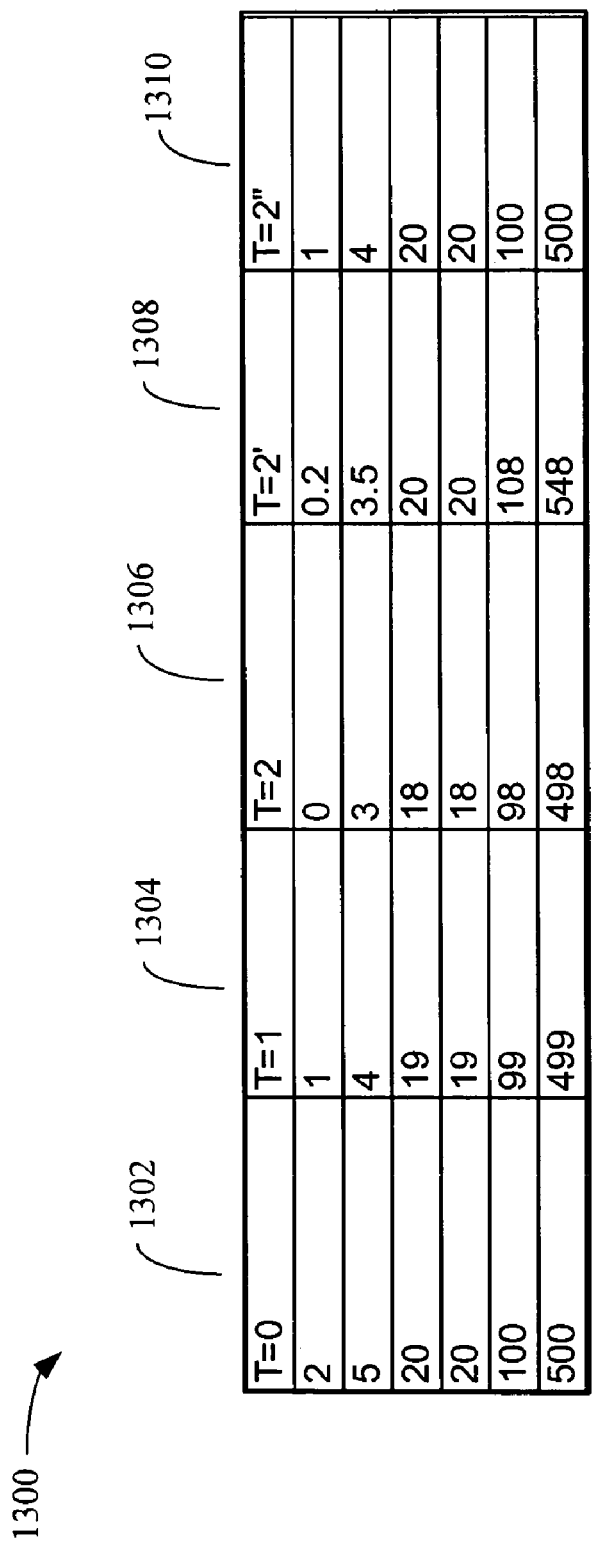
FIG. 13 is a chart showing how sample buckets may be decremented and incremented, in accordance with an example embodiment.

FIG. 13 is a chart 1300 showing how sample buckets may be decremented and incremented, in accordance with an example embodiment. Column 1302 may represent buckets before a networked contact center has received a call, as reflected by time equaling zero seconds (T=0 s), time and each of the buckets (e.g., DNIS bucket, the tenant bucket, the platform bucket, the cluster bucket, the site bucket and the carrier bucket) being set at initial maximum values.

A call may be accepted (e.g., by the limiter 524 of FIG. 5) at T=1 s because there are no empty buckets as shown in column 1302. Column 1304 shows each bucket after being decremented by one. A further call may be accepted at T=2 s because there are no empty buckets as shown in column 1304. In Column 1306, each of the buckets is shown to have been decremented by one when the call was accepted at T=2 s.

It may be noted that buckets are incremented at specific time intervals. In the example embodiment illustrated by a chart 1300, the specific time interval is two seconds. In an example embodiment, the increment module 528 of FIG. 5, after a two-second interval, may calculate 10% of a maximum value in column 1302 and add it to the current bucket value in column 1308. The increment module 528 may for example add 50 to the current carrier bucket (e.g., 498) to arrive at an incremented value of 548, which is shown in column 1308. The increment module 528 may then round up the bucket value or set the bucket value to its maximum value as shown in column 1310, where the carrier value has been set at 500.

Figure 14:
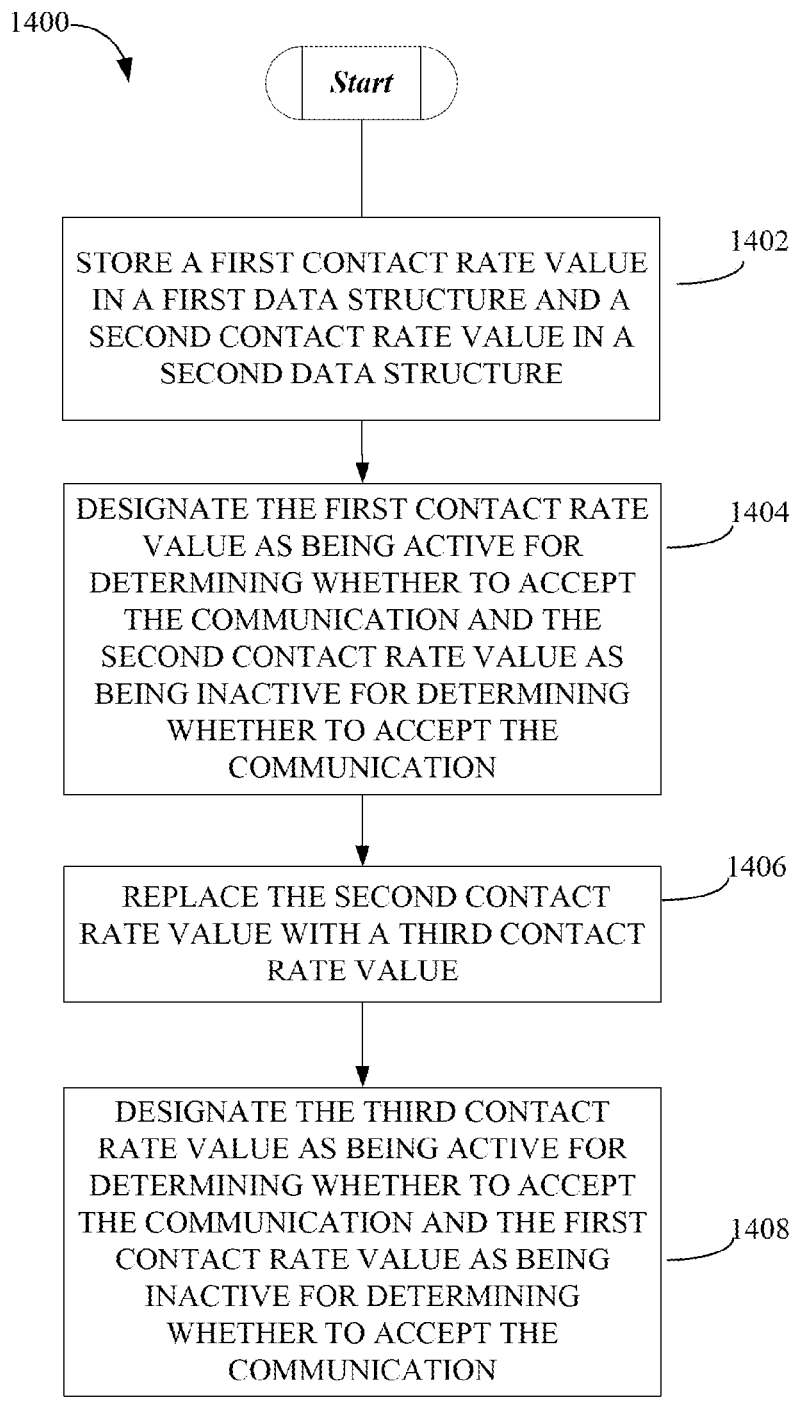
FIG. 14 is a flow diagram showing yet a further example method for limiting contact with a network contact center, in accordance with an example embodiment.

FIG. 14 is a flow diagram showing an example method 1400 for limiting contact with networked contact center, in accordance with an example embodiment.

At block 1402, the method 1400 may include storing a first contact rate value in the first data structure and storing a second contact rate value in a second data structure. Referring to FIG. 5, a first and second data structure may be stored in the routing databases 538. In various example embodiments, the initialization module 526 is to copy values into the data structures from the limit capacity database 516 at a time of system startup.

At block 1404, the example method 1400 may include designating the first contact rate value as being active for determining whether to accept the communication and the second contact rate value as being inactive for determining whether to accept the communication. The limiter 524 of FIG. 5 may designate one of the data structures as being active to be referenced or accessed for a contact rate or multiple contact rates, while the other of the data structures may be considered inactive.

At block 1406, the example method 1400 includes replacing the second contact value with a third contact rate value. For some example embodiments, the contact regulation module 506 of FIG. 5 is to send commands to the contact limiting modules 520 to cause the limiter 524 to copy contact rate values within the data structure of the limit capacity database 516 into data structures of the routing databases 538. The contact regulation module 506 may do so based on analyzing statistics from the event Monitor 504. Adjusting contact rate values may be seen as a tuning of front end contact limiting and may improve overall performance of the platform machines 502 all as shown in FIG. 5.

Block 1408 of the example method 1400 may include designating the third contact rate value as being active for determining whether to accept the communication and the first contact rate value as being inactive. It may be noted that the first second and third contact rate values each represent a quantity of contact within a particular time interval. The limiter 524, after having copied contact rate values from the limit capacity database 516 to the routing databases 538; all as shown in FIG. 5, may designate the new or adjusted contact rate values to be active and from there on, the limiter 524 may access the adjusted contact rate value or values.

The contact regulation module 506 may not only send commands to the contact limiting modules 520 to replace contact rate values in the routing databases 538 but may also send commands to the contact limiting modules 520 to change the time interval that the increment module 528, all as shown in FIG. 5, increments bucket values in the counter table 608 of FIG. 6 within the routing databases 538.

Figure 15:
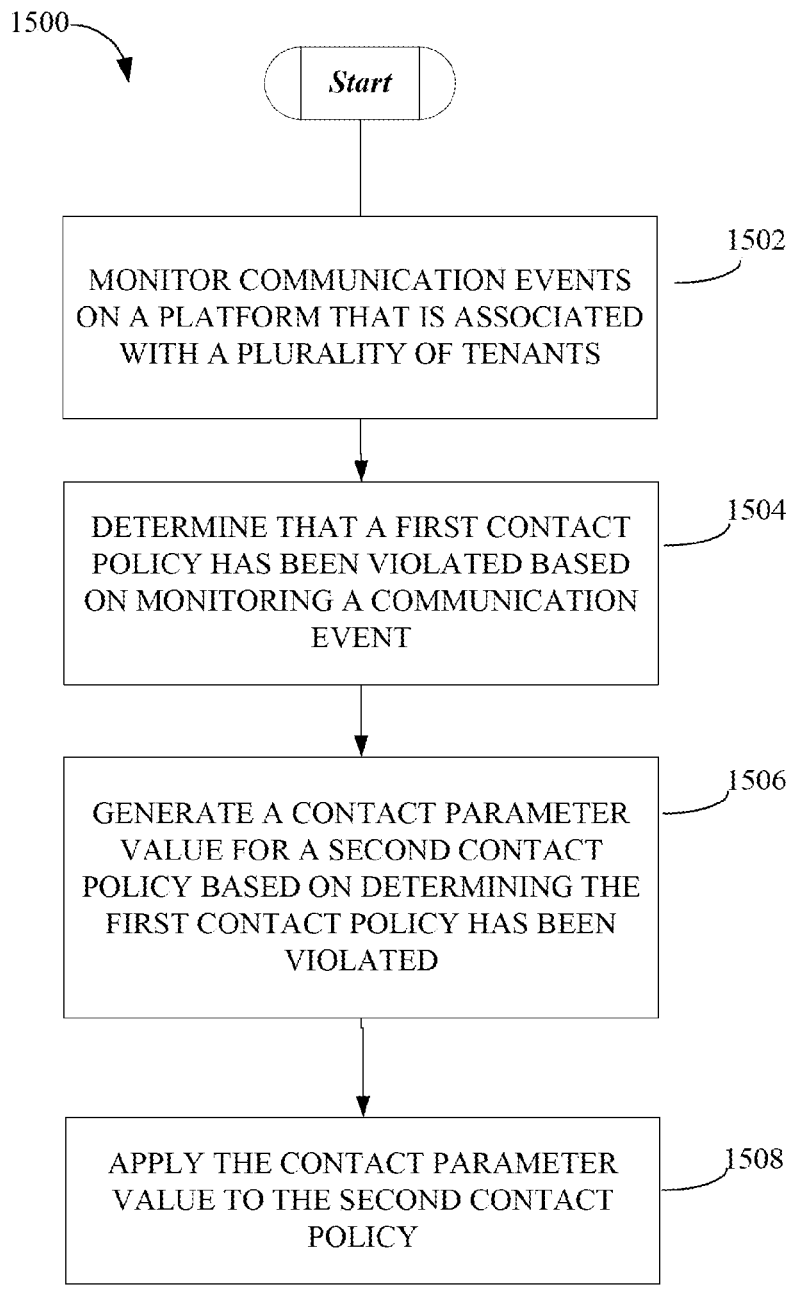
FIG. 15 is a flow diagram showing yet a further example method for limiting contact with a network contact center, in accordance with an example embodiment.

FIG. 15 is a flow diagram showing an example method 1500 for limiting contact with a network contact center, in accordance with an example embodiment. For some example embodiments, the example method 1500 may be implemented by the contact regulation module 506 and the event monitor 504 of FIG. 5.

At block 1502, the example method 1500 includes monitoring communication events on a platform that is associated with a plurality of tenants. As described above, the contact regulation module 506 may subscribe to various statistics captured by the event Monitor 504 of FIG. 5.

At block 1504, the example method 1500 may include determining that a first contact policy has been violated, based on the monitoring of the communication event. The example contact regulation module 506, in its analysis of subscribed statistics from the event monitor 504 may determine that the events occurring on the platform machines 502 exceed some threshold and is not in conformance with a back-end contact policy defined for the platform machines 502 all as shown in FIG. 5.

At block 1506, the example method 1500 may include generating a contact parameter value (e.g., a contact rate value) for a second contact policy based on determining that the first contact policy has been violated. The contact regulation module 506 of FIG. 5, in determining that a back-end contact policy has been violated may make a change to the front end contact policy by adjusting a value in the front end contact policy by writing that value to the limit capacity database 516 through the limit capacity module 512, both of FIG. 5, an example embodiment, a change made to a contact parameter of the first contact policy may include a change in a contact rate such as a bucket value or a change in an incrementing interval or any other contact related parameters.

At block 1508, the example method 1500 may include applying the parameter to the second contact policy. As noted, the contact regulation module 506 of FIG. 5 may send various commands to the contact limiting modules 520 of FIG. 5 to affect the contact policy implemented by the contact limiting modules 520. In some example embodiments, the contact regulation module 506 may command the contact limiting modules 520 to block all incoming calls after determining that resources on the platform machines 502 have reached a particular capacity.

FIG. 16 is a chart showing example commands 1600 generated by the contact regulation module to affect the front-end contact policy, in accordance with an example embodiment. In an example embodiment, the commands are SIP commands. In column 1602, the command reloadBucket may cause the limiter 524 of FIG. 5 to reset corresponding buckets with values extracted from the limit capacity database 516 of FIG. 5. The setBucket command may cause the limiter 524 to update a specific bucket within the tables 600 of FIG. 6 with the value provided in column 1606. As described above, the contact regulation module 506 may use the above commands to vary contact rates or stop further contact to the networked contact center 500. In an example embodiment in which contact has been stopped, the contact regulation module 506 may resume contact if it determines that contact policy allows it. The setInterval command of Column 1602 may cause the limiter 524 to reset the increment module 528 of FIG. 5 to increment bucket values according to the value provided in column 1604.

Computer System

Figure 17:
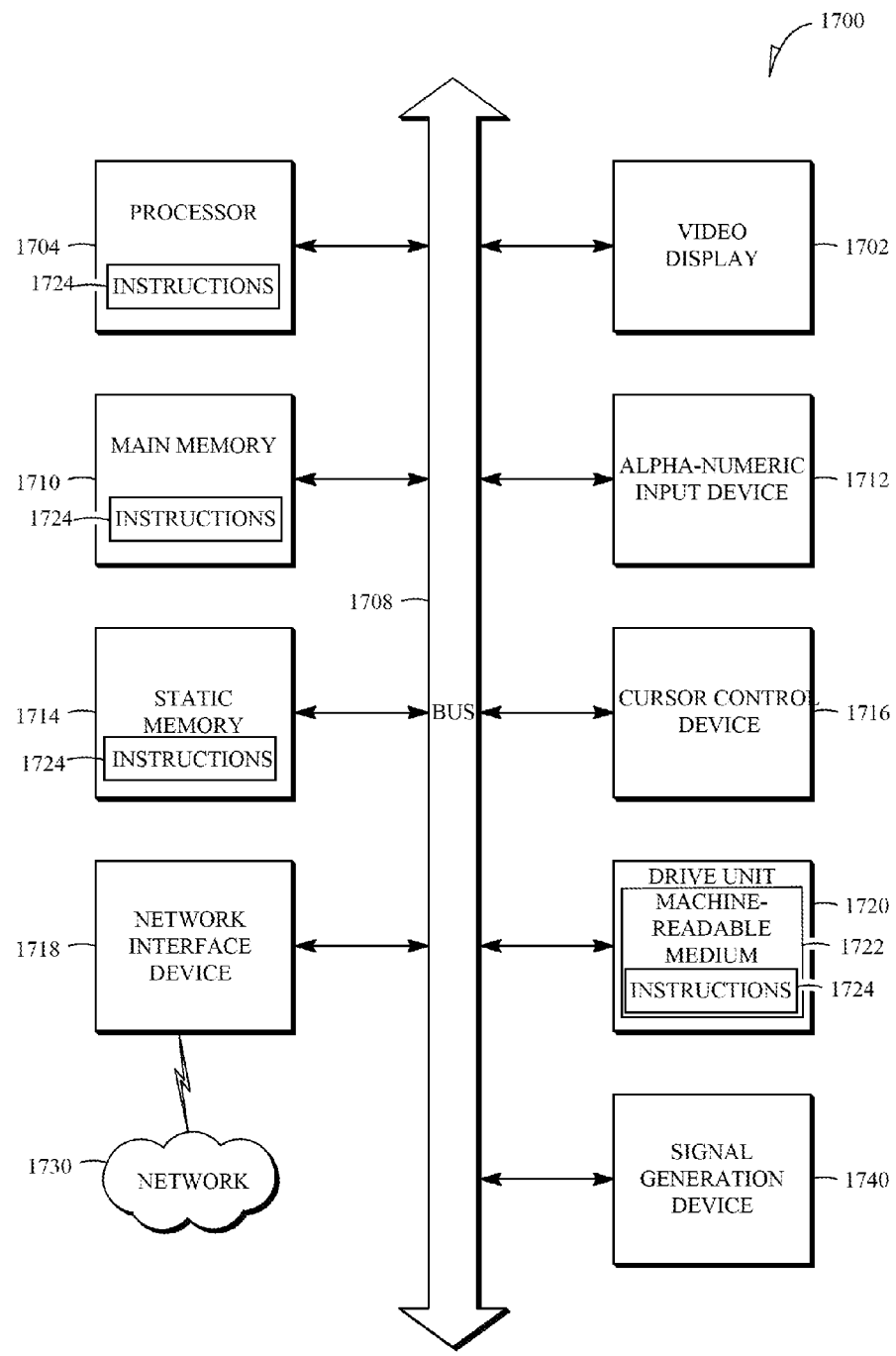
FIG. 17 is a block diagram showing an example machine, in accordance with an example embodiment.

FIG. 17 shows a diagrammatic representation of a machine in the example form of a computer system 1700 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a PC, a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1704 (e.g., a central processing unit (CPU), a graphics processing unit (GPU) or both), a main memory 1710 and a static memory 1714 which communicate with each other via a bus 1708. The computer system 1700 may further include a video display unit 1702 (e.g., a liquid crystal display (LCD) or a cathode ray tube (CRT)). The computer system 1700 also includes an alphanumeric input device 1712 (e.g., a keyboard), a cursor control device 1716 (e.g., a mouse), a drive unit 1720, a signal generation device 1740 (e.g., a speaker) and a network interface device 1718.

The disk drive unit 1720 includes a machine-readable medium 1722 on which is stored one or more sets of instructions 1724 (e.g., software) embodying any one or more of the methodologies or functions described herein. The instructions 1724 may also reside, completely or at least partially, within the main memory 1710 and/or within the processor 1704 during execution thereof by the computer system 1700, the main memory 1710 and the processor 1704 also constituting machine-readable media.

The instructions 1724 may further be transmitted or received over a network 1730 via the network interface device 1718.

While the machine-readable medium 1722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present subject matter. The term "machine-readable medium" shall accordingly be taken to include, but not be limited to, solid-state memories, optical and magnetic media and carrier wave signals.

The above description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. § 1.72(b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A networked contact center that hosts a plurality of tenants, the networked contact center comprising:
a plurality of platform machines, each platform machine including at least one central processing unit (CPU) and associated with a respective one of the plurality of tenants and having a respective contact parameter stored in a database;
a contact machine that is communicatively coupled to the plurality of platform machines and that includes at least one central processing unit (CPU) that is configured to:
in response to receiving a communication:
determine one of the plurality of tenants is associated with the communication;
determine whether one of the plurality of platform machines associated with the determined tenant is allowed to accept the communication based on the respective contact parameter for the one of the plurality of platform machines; and on information indicative of whether one or more calls is allowed to be routed to a plurality of communication layers within a first time interval and by maintaining values representing a number of ongoing network communications associated with each of the plurality of communication layers, the respective contact parameter being associated with a quantity of contact within the first time interval, wherein the plurality of communication layers includes at least two of a dialed number identification service layer, a tenant layer, a platform layer, a cluster layer, a site layer, and a carrier layer,
in response to determining that the one of the plurality of platform machines associated with the determined tenant is not allowed to accept the communication, reject the communication to the one of the plurality of platform machines;
in response to determining that the platform machine is allowed to accept the communication, route an initiation of the communication to the determined one of the plurality of tenants; and
adjust at least one of the respective contact parameters based at least in part on the received communication, and
wherein the platform machine is further configured and arranged to reject the communication, in response to receiving the routed initiation of the communication, based on available platform resources.

2. The networked contact center of claim 1, wherein the communication includes a voice communication, a chat communication, an email communication, or a combination thereof, wherein the initiation includes a communication of data indicating the determined tenant.

3. The networked contact center of claim 1, wherein the contact machine is configured and arranged to:
determine the platform machine of the plurality of platform machines that is associated with the determined tenant using data in the received communication that is indicative of the determined tenant.

4. The networked contact center of claim 1, wherein at least one of the plurality of tenants has a plurality of contact parameters stored in the database.

5. The networked contact center of claim 4, wherein each of the plurality of contact parameters has a respective status stored in the database, the status indicating whether the contact parameter is active or disabled.

6. The networked contact center of claim 5, wherein the contact machine is configured and arranged to determine whether one of the plurality of platform machines associated with the communication is allowed to accept the communication based on the ones of the plurality of contact parameters having a status indicating the contact parameter is active.

7. The networked contact center of claim 5, wherein the platform machine corresponding to the at least one of the plurality of tenants is configured and arranged to adjust the statuses of the plurality of contact parameters based on an operating status of the platform machine.

8. The networked contact center of claim 1, wherein the database forms a storage layer, and the platform machines foul' a platform layer, the platform machines configured to share access to the storage layer.

9. A system comprising:
a networked contact center that includes a plurality of communication layers, the communication layers including:
at least one database in a storage layer, and
platform machines in a platform layer, the platform machines including one or more central processing units and configured to share access to the storage layer; and
at least one contact machine including a central processing unit and communicatively coupled to the platform machines, the contact machine configured and arranged to:
receive a network communication,
identify, based upon the received network communication, a particular platform machine of the platform machines in the platform layer, and
determine availability of platform resources associated with the particular platform machine based upon a contact parameter for each of the plurality of communication layers,
reject, in response to determining that one of the platform resources is not available, the network communication to the particular platform machine,
determining that the platform machine is allowed to accept the communication based on the respective contact parameter and on information indicative of whether one or more calls is allowed to be routed to a plurality of communication layers within a first time interval and by maintaining values representing a number of ongoing network communications associated with each of the plurality of communication layers, the respective contact parameter being associated with a quantity of contact within the first time interval, wherein the plurality of communication layers includes at least two of a dialed number identification service layer, a tenant layer, a platform layer, a cluster layer, a site layer, and a carrier layer; and
route, in response to determining that the one platform resources is available, an initiation of the network communication to the particular platform machine, and
wherein the particular platform machine is further configured and arranged to reject the network communication, in response to receiving the routed initiation, based on available platform resources.

10. The system of claim 9, wherein the at least one contact machine is further configured and arranged to determine availability of platform resources by maintaining bucket values representing a number of ongoing network communications associated with each of the plurality of communication layers.

11. The system of claim 10, wherein the bucket values correspond to the network communications associated with a respective one of a networked contact center dialed number identification service (DNIS) bucket, a tenant bucket, a platform bucket, a cluster bucket, a site bucket and a carrier bucket.

12. The system of claim 10, wherein the at least one contact machine is further configured and arranged to maintain the bucket values by decrementing, after a communication is allowed, corresponding bucket values by a selected value.

13. The system of claim 12, wherein the at least one contact machine is further configured and arranged to maintain the bucket values by incrementing, after a specific time interval, the corresponding bucket values by the selected value.

14. The system of claim 13, wherein the at least one contact machine is configured to adjust the specific time interval in response to feedback.

15. The system of claim 9, wherein the at least one contact machine is further configured and arranged to generate, in response to rejecting the routing from routing the communication to the particular platform machine, a rejection message.

* * * * *